Dec. 8, 1953     H. E. MICHAEL     2,661,975
AIRCRAFT DOOR LOCK
Filed Oct. 14, 1950     3 Sheets-Sheet 1
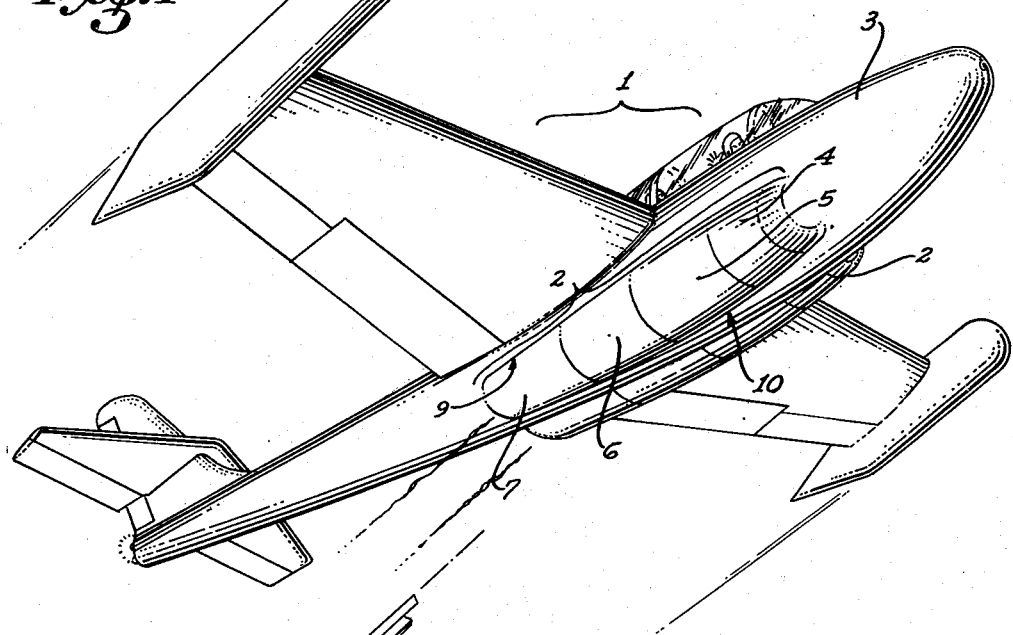
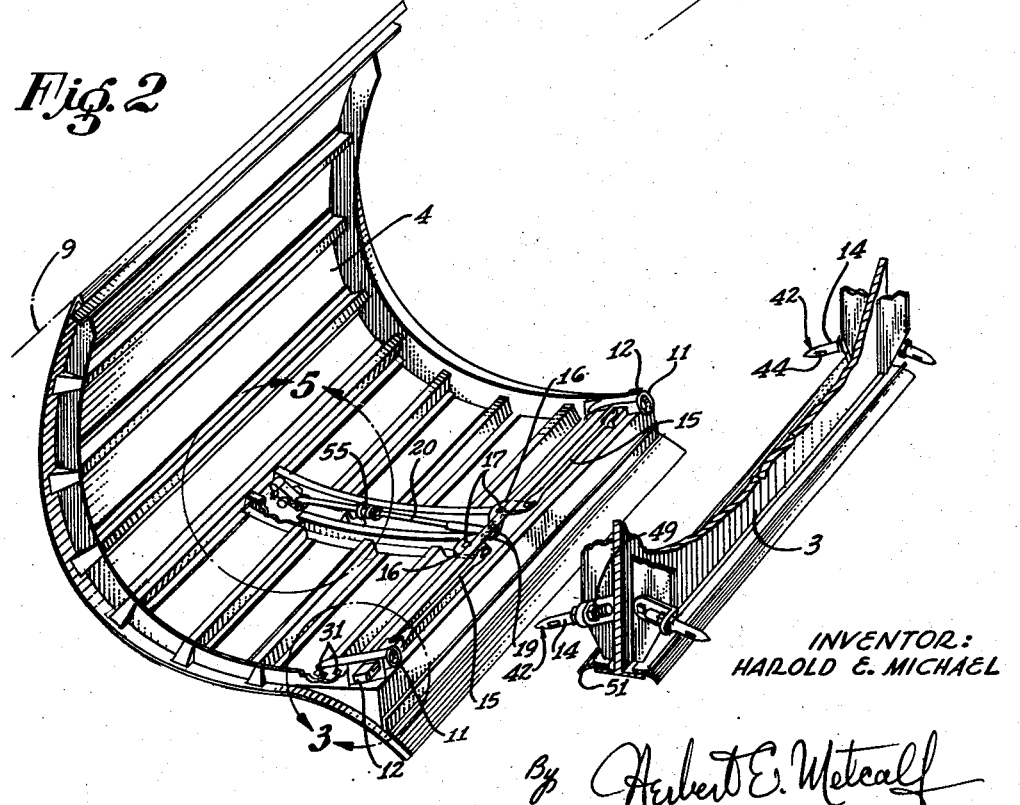
INVENTOR:
HAROLD E. MICHAEL
By Herbert E. Metcalf
HIS PATENT ATTORNEY Dec. 8, 1953 H. E. MICHAEL 2,661,975
AIRCRAFT DOOR LOCK
Filed Oct. 14, 1950 3 Sheets-Sheet 2

INVENTOR:
HAROLD E. MICHAEL

By Herbert E. Metcalf
HIS PATENT ATTORNEY

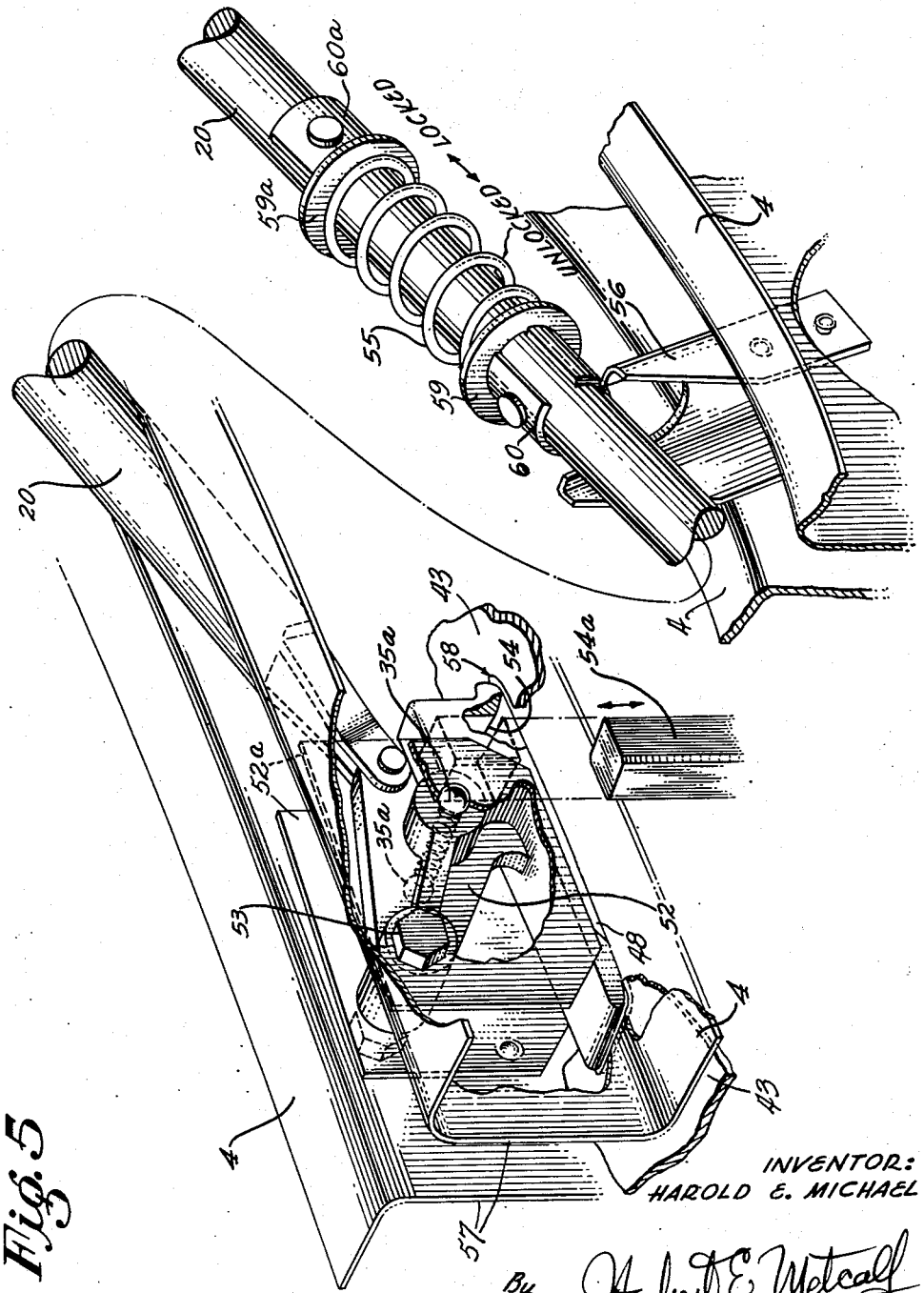

Patented Dec. 8, 1953

2,661,975

UNITED STATES PATENT OFFICE 2,661,975

AIRCRAFT DOOR LOCK

Harold E. Michael, Hawthorne, Calif., assignor to Northrop Aircraft, Inc., Hawthorne, Calif., a corporation of California Application October 14, 1950, Serial No. 190,106

9 Claims. (Cl. 292—302)

This invention relates to latches, and, more particularly, to a door latch especially suited for locking external doors or panels in a closed position on the surface of an airplane.

The requirements for a suitable aircraft door lock differ substantially from those of ordinary locks and latches in common use elsewhere. Speed and accuracy of operation, resistance to loads from many directions, and positive locking action during normal vibration and operating conditions are the main requirements to be satisfied.

Accordingly, the objects of the present invention include providing an aircraft door lock which will always be aligned or will align itself with the mating door parts to assure closing in the proper position, providing a lock which will pull the door in place against pressure of sealing strips and the like, and which will positively separate the door from its mating structure when unlocked, providing a lock which will carry loads from all directions, which will have no load which tends to provide an unlocking force, and which may be easily operated in gangs of two or more from a remote position Some aircraft doors and panels are relatively bulky, large, and have various shapes and contours, so that two men are sometimes needed to properly engage the door in its closed position, e. g., one to hold the door closed or nearly closed while the other performs the locking operation.

It is, therefore, a further object of this invention to provide an aircraft door lock having a prelatching position to hold the door in place until the final lock is accomplished.

Other objects and features of advantage will be noted in the description of specific apparatus forming a part of this specification, to follow.

Briefly, the present invention comprises a lock member having a bolt slidable therethrough, these two parts preferably mounted on the hinged door. A striker, mounted on the closure structure around the door, enters the lock perpendicularly to the path of the bolt. Locking is accomplished by a tongue within the bolt which engages a slot through the striker. The tongue is beveled on two sides to provide a sliding lever action when locking the door and to accomplish a prelatching action, in combination with a spring-loaded link attached to the bolt, to return it to a partially locked position when the striker enters the bolt a given distance. The bolt includes a cam surface to engage the end of the striker to force it from the bolt during the unlocking operation. Each lock assembly is normally held in both a locked and a prelatched position by two springs, balls, and ball detents. When locked, the loads on the tongue and striker are purely in shearing directions, thus precluding any force which tends to open the lock.

My invention may be more readily understood by reference to the accompanying drawings, shown by way of illustration and not limitation, wherein:

Figure 1 is a perspective view showing an airplane using engine nacelle doors having locks made according to the present invention.

Figure 2 is a perspective view showing the right-hand front nacelle door in a slightly open position, as viewed from ahead of and above the door.

Figure 5 is an enlarged detail view, partly cutaway, showing a lock operating means and prelatching spring viewed as indicated by the boundary line "5" in Figure 2.

Figure 3:
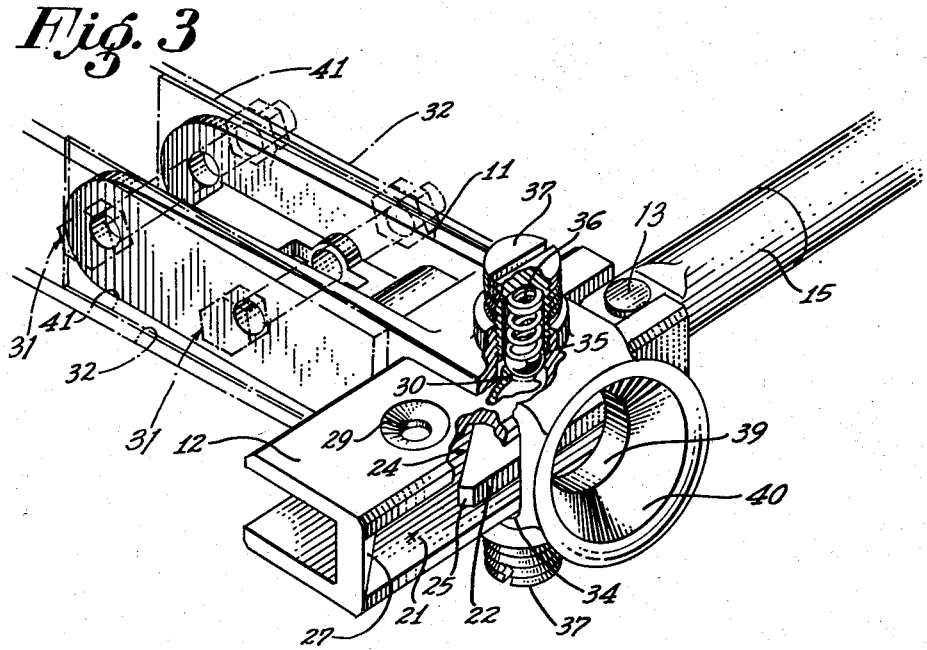
Figure 3 is a perspective cut-away view showing, on a larger scale than Figure 2, the lock and bolt arrangement at one corner of the door, viewed as indicated by the boundary line "3" in Figure 2.

Referring first to Figure 1 for a detailed description of a preferred embodiment of this invention, an airplane 1 has engine nacelles 2 on each side of the fuselage 3 equipped with quickly removable nacelle doors 4, 5, 6 and 7. The doors swing about an upper hinge line 9 and are locked closed against an intervening fuselage section providing a lower edge 10 near the bottom center line of the fuselage.

The forward right-hand door 4 is further shown in Figure 2, as viewed from within the nacelle looking aft and outwardly at the inner side of the door. At each end of the door 4, a lock member 11 is fixed to the door, and a bolt 12 is slidable fore-and-aft within the lock 11. Attached to the fuselage 3 are two strikers 14 positioned to enter the locks 11 when the door is closed and be engaged by the bolts 12 when the door is locked.

An adjustable actuating rod 15 is connected to the inner end of each bolt 12, as by rivet 13, these rods 15 in turn being connected respectively to two bell cranks 16 which are pivotally connected to the door 4 at crank pivots 17. The bell cranks 16 have slotted arms 19 which are mutually connected to an opening rod 20 movable crosswise of the door 4. It is thus seen that when the operating rod 20 is pulled outwardly from the fuselage 3, the bell cranks 16 and actuating rods 15 operate to pull both bolts 12 toward the center of the door. This releases the door from its locked position as will be further described herein.

Figure 4:
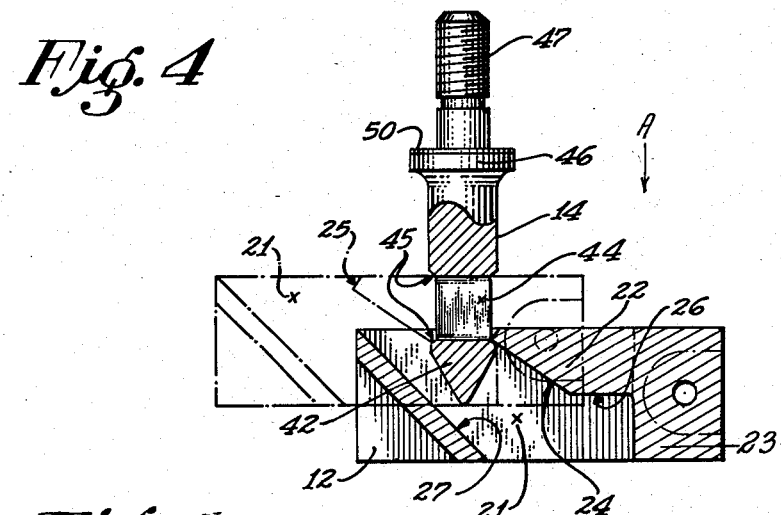
Figure 4 is a longitudinal sectional view, partly in profile, of the bolt and the striker alone, showing a prelatched position of the bolt, in solid lines, and the locked position of the bolt, in dashed outline.
Figure 4A:
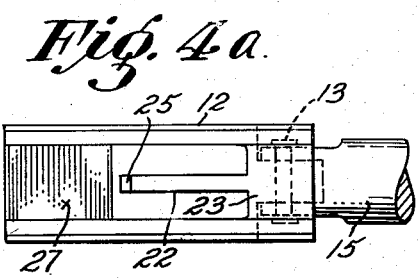
Figure 4a is a top view of the bolt, viewed as indicated by the arrow A in Figure 4, with the striker omitted.

As shown in Figures 3 and 4, each bolt 12 is rectangular in form with a vacant central portion 21 into which the striker 14 will extend. A tongue 22 is formed within the bolt, the tongue pointing toward the adjoining end of the door 4 and having a relatively long lower bevel 24 and a short upper bevel 25 intersecting at the tip of the tongue. The bottom of the tongue 22 near its supported end has a straight portion 26 parallel to the sides of the bolt 12. The tongue 22 bisects the vacant portion 21 and is connected to the bolt 12 only at the base 23 of the tongue, as shown in Figure 4a. The base 23 of the tongue and a slanting cam surface 27 form partitions from side to side of the bolt 12. The slanting cam surface 27, at the end of the vacant portion 21, extends approximately parallel to the lower bevel 24.

Two ball detents 29 and 30 are located in a fore-and-aft line in each exterior side of the bolt 12, each detent on one side being exactly opposite a detent on the other side. These detents aid in establishing prelatched and locked positions of the door, and will be referred to later.

The lock 11 (Figures 2 and 3) is fixed to the door 4 by means of two mounting bolts 31 in sheet metal brackets 32 fixed to the door, and contains a rectangular opening 34 through which the bolt 12 slides. On opposite sides of the opening 34, and adjacent to the path of the ball detents 29 and 30 of the bolt 12, two threaded holes are provided in the lock 11, and a steel ball 35, spring 36, and retainer 37 are installed in these holes to press the balls against the sides of the bolt 12 and into the detents.

At the end of the lock 11 facing the striker 14 on the fuselage 3, a receiving bore 39 having a wide-mouthed entrance 40 is provided, the bore intersecting the rectangular opening 34 at right angles to the sliding path of the bolt 12. The receiving bore 39 mates with the striker 14 as the door is being closed, and shims 41 may be installed on either side of the lock 11 within the brackets 32 to allow sufficient adjustment of the lock position during installation so that no binding of the strikers 14 in the locks 11 occurs after closure. Two shims 41 are preferably employed, one nominally on each side of the lock 11, thus providing a selection of three lateral lock positions.

As further shown in Figures 2 and 4, each striker 14 carries a tapered nose 42 which first contacts the bore entrance 40, thus assuring alignment of the locking parts each time the door 4 is closed, by positioning the door to an exact location in a plane normal to the striker center-line. Thus, any play at the door hinge line 9 or swaying of the open edge of the relatively large door 4, will not inhibit proper mating of the locking parts whenever the door is pushed closed. Although the receiving bore 39, entrance 40, tapered nose 42 and striker 14 are shown as having a circular cross section, these parts may obviously be made with a square or rectangular cross section, if desired. A slot 44 through the striker 14 accommodates the tongue 22 of the bolt 12 as the latter moves into locking position. Chamfered edges 45 on the slot 44 present a larger bearing surface to the lower bevel 24 of the tongue 22 than if the edges were left sharp.

The striker 14 carries a mounting flange 46, which bears against the fuselage structure when installed, and a threaded stud 47 on which a nut 49 is threaded to retain flange 46 against the flange of the fuselage wherein the stud 47 is mounted. Linear adjustment of the striker position in a door swinging direction is provided by removing or installing spacer washers 50 between the flange 46 and the fuselage 3, so that a suitable snug fit is obtained between the door and its sealing strips 51 on the fuselage when locked.

A suitable operating mechanism for these door locks is shown in Figures 2 and 5. The operating rod 20 is rotatably connected to a handle socket member 52 pivotally mounted on an axis bolt 53 just inside a cut-out 58 in the outer skin 43 of the door 4. Socket member 52 is mounted between two side plates 52a riveted to channel sections 57 forming a part of the door structure, to strengthen the installation. A recess 54 is provided in the outer side or bottom of the handle socket member 52 whereby a lever 54a or the like may be inserted to rotate the socket member 52 and control the operating rod 20. The socket member 52 is held in the "door locked" position with small spring-loaded balls 35a and detents between the socket and side plates 52a similar to the ball and detent means between the bolt 12 and lock 11. The socket member 52 in this specific embodiment is a casting having a thin outer element 48 integral therewith for manually pushing inwardly to unlock the door.

Between the locked and completely unlocked positions of the linkage components heretofore described, a prelatched position is provided, and a latching spring 55 on the operating rod 20 returns the linkage to the prelatched position from the unlocked position. The latching spring 55 is mounted between two slidable washers 59 and 59a which bear against two collars 60 and 60a on the respective outer sides thereof. Collars 60 and 60a are secured to operating rod 20. When the rod 20 is pulled to the unlocked position, one washer 59 bears against a spring stop 56 attached to the door 4 while its receptive collar 60 passes on through the stop 56, thus compressing the spring 55. When the operating rod 20 is then released, the latching spring 55 urges the linkage members and the bolt 12 back to the prelatched position as determined by the spring location.

At each of the bolts 11, the first detents 29 are occupied by the balls 35 at the prelatched position, thus affording additional means for properly determining this position. The second detents 30 in the bolt 12 are occupied by the balls 35 at the locked position, simultaneously with the ball and detent assembly at the handle socket member 52.

Several important features of this invention are illustrated in Figure 4, the solid outlines of which show the bolt 12 in the prelatched position, while the dotted lines show the bolt in locked position after the tongue 22 has completely engaged with the striker 14. The lock 11 is omitted from this view for clarity of illustration. It will be noted that the upper bevel 25 has the same angle as the striker nose 42, such that when the door 4 is closed by a gentle slam, the bolt 12 will be pushed aside until the tongue 22 is opposite the slot 44 in the striker 14, and will then return to the prelatched position with the tongue 22 extending into the slot 44 a sufficient distance to support the door unaided by external forces. To complete the locking, the handle socket member 52 is rotated to a position flush with the outer skin 43 (Figure 5), from the outside of the door, and the bolt 12 is thereby pushed to its outermost position as shown in dotted lines in Figure 4, thus pulling the door tightly in place to the final locked position along the lower bevel 24 and onto the parallel position 26.

In any bolt position, the upper edge of the tongue 22, which is flush with the top of the bolt 12, can bear against the outer side of the rectangular opening 34 in the lock 12 and thus transmit door loads directly to the lock 11, so that the tongue 22 may not be required to take excessive bending loads. Since the striker 14 is also surrounded by the lock bore 39, it is easily seen that the present lock holds the door fixed against all loads in every direction. Because of the parallel portion 26 on the bottom of the tongue 22, on which the striker 14 bears when locked, no load components act in a direction to unlock the door.

To unlock and open the door, the bolt 12 is withdrawn from the striker 14 by rotating the handle socket member 52, and in the event of the door tending to stick closed, the cam surface 27 bears against the end of the striker nose 42 to force separation of the parts and opening of the door 4.

As shown herein, the door 4 has two locks, both operable by a single handle or lever. However, it is obvious that a single lock can similarly be operated, or that three or more locks can also be gang-operated by adding other actuating rods. For ease of operation and protection of moving parts, the bolt 12 and the projecting end portion of the striker 14 are preferably given a graphite coating to reduce the sliding friction.

Thus, it is seen that the door locking device of the present invention is very easily, simply, and quickly operated, which makes it especially suitable for aircraft installations requiring a minimum of maintenance time. It is also inherently accurate in its locating and locking positions, and is durable from the standpoint of wear and load-bearing strength.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. An aircraft lock for locking a hinged door or panel closed against the fixed structure of the aircraft, comprising a receiving member attached to said door and having a receiving passage axially facing said structure at a door closing point, a bolt member slidable through said receiving member in a direction perpendicular to the central axis of said passage, a striker member fixed to said structure opposite said receiving member and adapted to project into said passage when said door is closed, said striker having an elongated hole extending therethrough parallel to the sliding direction of said bolt in said receiving member, a tongue within said bolt located to enter and fill said elongated hole when said striker has entered said receiving member, to thus determine a locked position, and operating means comprising a linkage connected to slide said bolt to and from said locked position, an actuating member pivotally mounted on said door near the outer surface thereof, and a crank arm on said actuating member rotatably connected to said linkage, said actuating member arranged to lie flush with said door outer surface when said door is locked.

2. Apparatus in accordance with claim 1 including a relatively long sloping surface on one side of said tongue positioned to contact the outermost end of said elongated hole remote from said structure as said bolt is being moved toward said locked position, to pull said door closed by sliding cam action, a relatively short sloping surface on the other side of said tongue intersecting said long sloping surface to form an acute angle tip on said tongue, said striker having a tapered nose positioned to guide said receiving member into alignment around said striker during closure of said door, said short sloping surface having substantially the same angle in said aircraft as the side of said tapered nose, said bolt having a prelatched position in said receiving member where said tongue tip extends into the path of said tapered nose, and elastic means connected to urge said bolt to said prelatched position from an unlocked position where said tongue is out of the path of said striker, whereby said tongue is adapted to automatically partially engage in said elongated hole during preliminary closure of said door.

3. Apparatus in accordance with claim 2 wherein said bolt includes a fixed cam surface having approximately the same angle in said aircraft as the side of said tapered nose, said cam surface positioned to slidably bear against the end of said tapered nose as said bolt is slid away from said locked position, whereby said striker is forced out of said receiving member in the event of said door tending to stick closed.

4. A lock for fastening two parts together, comprising a receiving member attached to one of said parts and having a receiving passage axially facing the other of said parts, a bolt member slidable through said receiving member in a direction perpendicular to the central axis of said passage, a striker member fixed to said other part opposite said receiving member and adapted to project into said passage when said parts are brought together, said striker having an elongated hole extending therethrough parallel to the sliding direction of said bolt in said receiving member, a tongue movable with said bolt located to enter and fill said elongated hole when said striker has entered said receiving member, to thus determine a locked position, operating means connected to slide said bolt to and from said locked position, said receiving passage having a flared mouth, said striker having a tapered nose positioned to guide said receiving member and said striker into alignment from off-center positions during closure of said parts, and said striker having a main body portion substantially filling said passage when said parts are closed, whereby said lock carries loads from all directions.

5. A lock for fastening two parts together, comprising a receiving member attached to one of said parts and having a receiving passage axially facing the other of said parts, a bolt member slidable through said receiving member in a direction perpendicular to the central axis of said passage, a striker member fixed to said other part opposite said receiving member and adapted to project into said passage when said parts are brought together, said striker having an elongated hole extending therethrough parallel to the sliding direction of said bolt in said receiving member, a tongue movable with said bolt located to enter and fill said elongated hole when said striker has entered said receiving member, to thus determine a locked position, operating means connected to slide said bolt to and from said locked position, a sloping side on said tongue positioned to contact the outermost end of said elongated hole remote from said other part as said bolt is being moved toward said locked position, to pull said parts together by sliding cam action of said sloping side against said elongated hole end, and a straight portion on said tongue intersecting said sloping side near the base of said tongue, said straight portion being parallel to the path of motion of said bolt in said lock, the length of said straight portion being at least as great as the thickness of said striker at said elongated hole.

6. A lock for fastening two parts together, comprising a receiving member attached to one of said parts and having a receiving passage axially facing the other of said parts, a bolt member slidable through said receiving member in a direction perpendicular to the central axis of said passage, a striker member fixed to said other part opposite said receiving member and adapted to project into said passage when said parts are brought together, said striker having an elongated hole extending therethrough parallel to the sliding direction of said bolt in said receiving member, a tongue movable with said bolt located to enter and fill said elongated hole when said striker has entered said receiving member, to thus determine a locked position, operating means connected to slide said bolt to and from said locked position, a first sloping side on said tongue positioned to contact the outermost end of said elongated hole remote from said other part as said bolt is being moved toward said locked position, to pull said parts together by sliding cam action of said first sloping side against said elongated hole end, a second sloping side on said tongue intersecting said first sloping side at the tip of said tongue, said striker having a tapered nose positioned to guide said receiving member into alignment around said striker from off-center positions during closure of said parts, said second sloping side having a predetermined angle to meet said tapered nose along a sloping surface intersection, said bolt and tongue having a prelatched position where said tongue tip lies in interference with said tapered nose when said parts are being closed, and elastic means connected to urge said bolt and tongue to said prelatched position from an unlocked position where said tongue and striker do not interfere in passing, whereby said interference during preliminary closure causes said tongue to move against said elastic means until said tongue tip is opposite said elongated hole and then said tongue tip will engage in said elongated hole in said prelatched position to hold said parts adjacent prior to locking by said sliding cam action.

7. Apparatus in accordance with claim 6 wherein bolt holding means is provided at said locked and prelatched positions to tend to prevent sliding of said bolt out of said positions.

8. Apparatus in accordance with claim 6 wherein a spring-loaded ball is contained in said lock to bear upon the side of said bolt, and two ball detents are positioned in said bolt side to be occupied by said ball at said locked and prelatched positions, respectively.

9. A lock for fastening two parts together, comprising a receiving member attached to one of said parts and having a receiving passage axially facing the other of said parts, a bolt member slidable through said receiving member in a direction perpendicular to the central axis of said passage, a striker member fixed to said other part opposite said receiving member and adapted to project into said passage when said parts are brought together, said striker having an elongated hole extending therethrough parallel to the sliding direction of said bolt in said receiving member, a tongue movable with said bolt located to enter and fill said elongated hole when said striker has entered said receiving member, to thus determine a locked position, operating means connected to slide said bolt to and from said locked position, and a cam surface fixed to said bolt to slidably bear against the projecting end of said striker member when said bolt is slid away from said locked position, said cam surface being directed to force said striker out of said receiving member in the event of sticking.

HAROLD E. MICHAEL.

References Cited in the file of this patent

UNITED STATES PATENTS

| Number | Name | Date |
|---|---|---|
| 2,210,989 | Sutherland | Aug. 13, 1940 |
| 2,560,459 | Lundberg | July 10, 1951 |